Sept. 9, 1969          R. A. SPYRA          3,465,546
UNIVERSAL JOINTS
Filed May 20, 1968          3 Sheets-Sheet 1
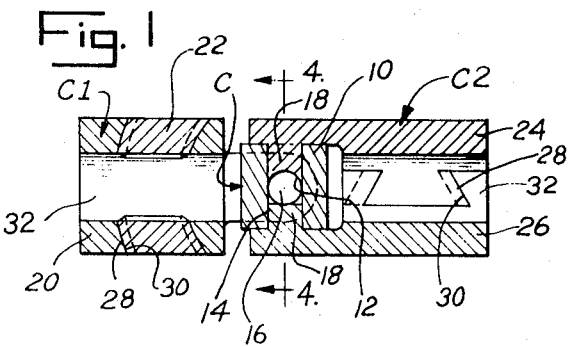
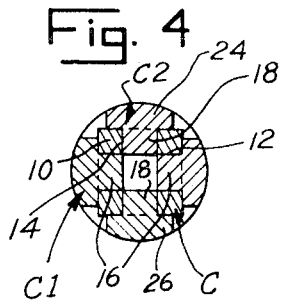
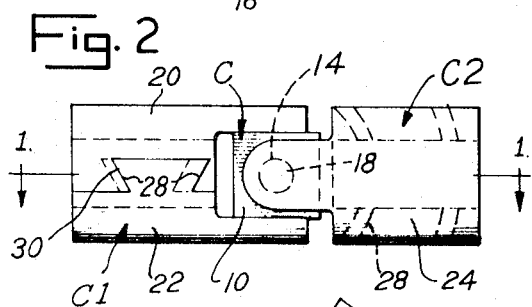
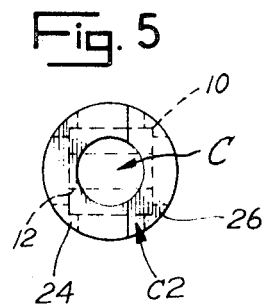
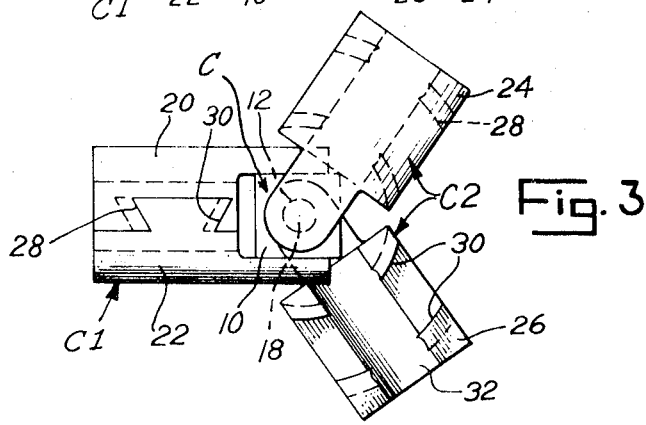
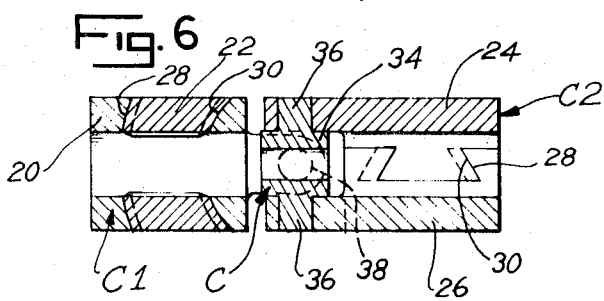
INVENTOR
RUDOLF A. SPYRA
BY Bair, Freeman & Molinare
ATTORNEYS

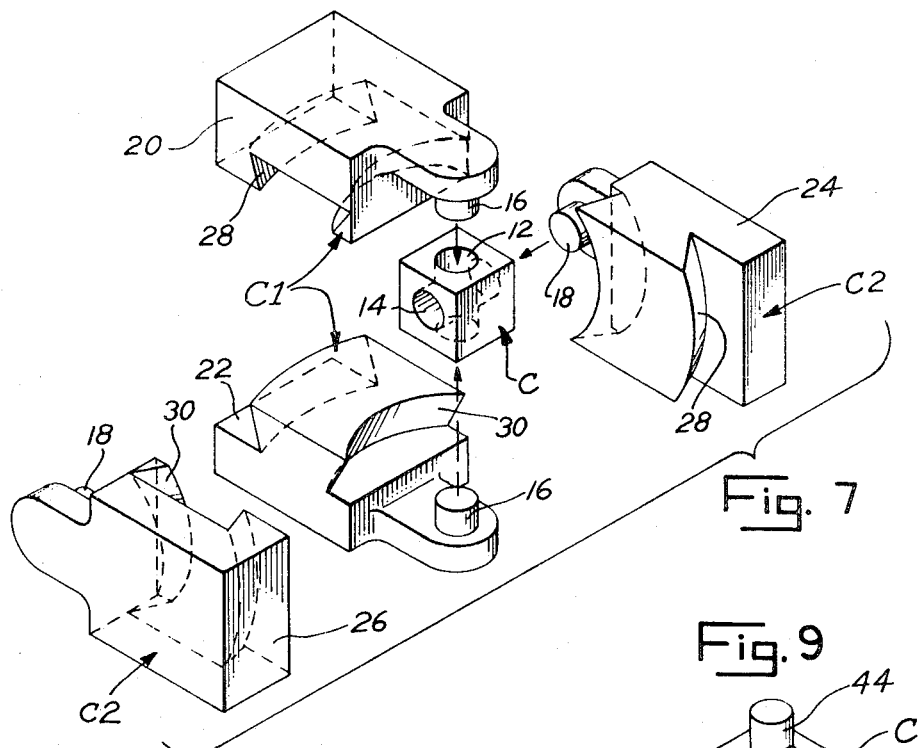
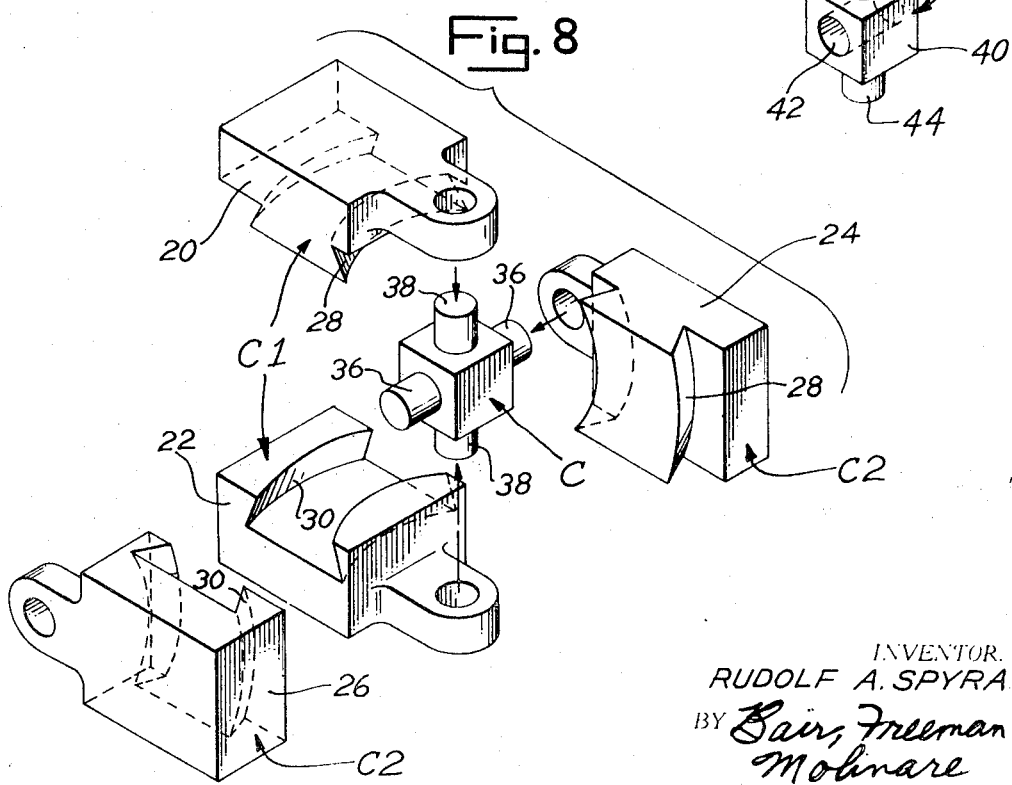

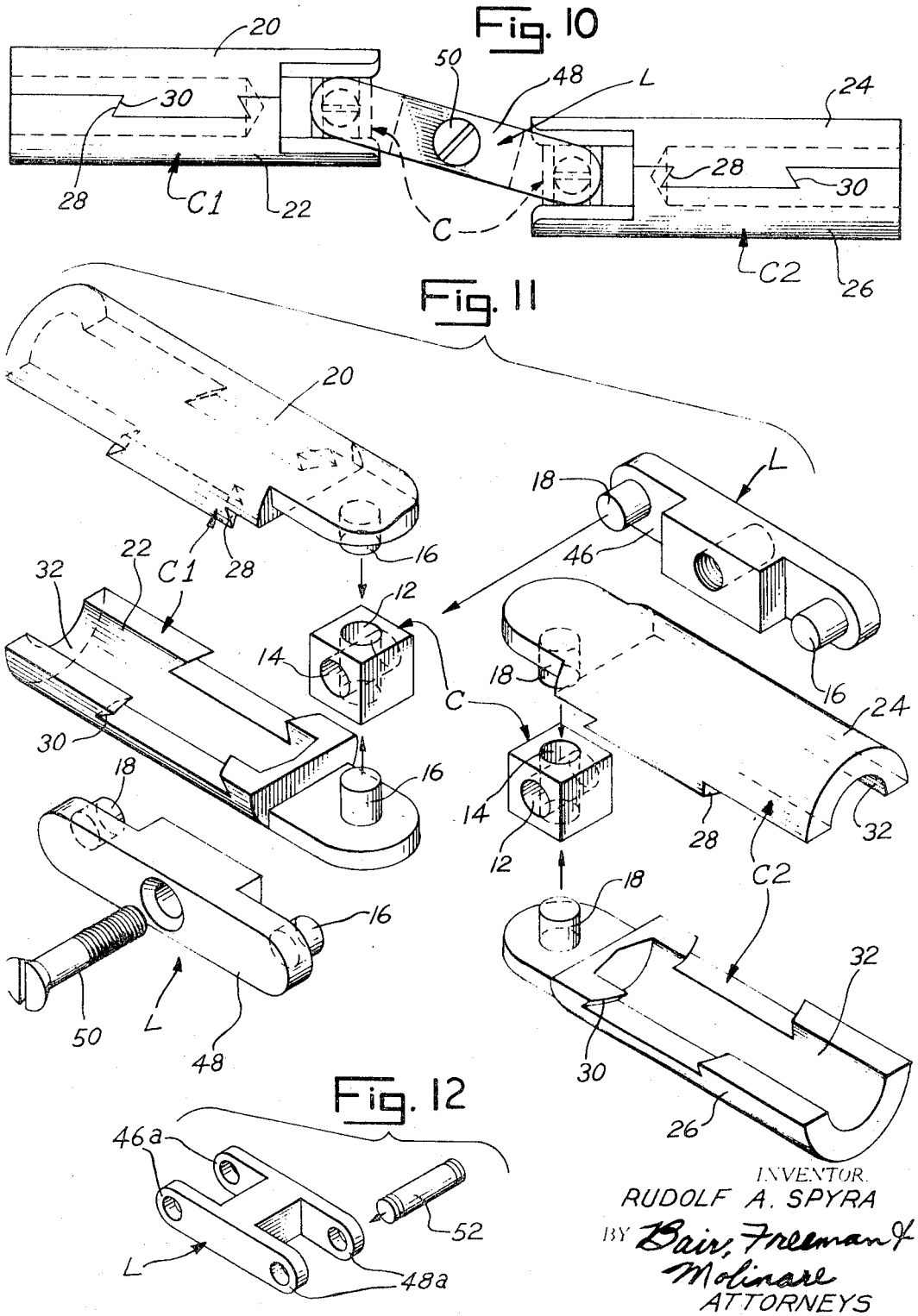

United States Patent Office 3,465,546
Patented Sept. 9, 1969

3,465,546
UNIVERSAL JOINTS
Rudolf A. Spyra, 5344 N. Paulina,
Chicago, Ill. 60640
Filed May 20, 1968, Ser. No. 730,297
Int. Cl. F16d 3/40
U.S. Cl. 64—17                                                9 Claims

ABSTRACT OF THE DISCLOSURE

Universal joints which include two-part connector members straddling a cross member, the two parts being connected together by mating dove-tail joints which are generated on a radius from a pivot axis of the cross member. Coacting studs and holes of the cross member and the connector members may be associated with each other while the two parts of the connector member are spread apart, and then the two parts may be assembled by rotating them to an aligned connected position wherein the dove-tails mate with each other, after which the insertion of a shaft into a bore of the two parts of the connector member will retain them against disassembly. The dove-tail feature may be applied to simple universal joints, or those of dual character wherein two connector membrs are pivoted to two cross members and a link connects the two cross members together.

Background of the invention

Heretofore universal joints consisting of two connector members and a cross member have been designed in various ways for assembly in respect to each other. Various methods for connecting two parts of a connector member together have been devised as well as various designs of cross members for insertion between the bifurcated ends of solid connector members.

One object of my present invention is to provide a simple means of rigidly connecting the two parts of a two-part connector member together comprising dove-tail connections between them, wherein the inclined side edges of the dove-tail connections are generated on a radius from the pivot axis of the cross member with which the pivot ends of the two parts of the connector member are pivotally associated.

Another object is to provide two-part connector members which may be pivotally associated with a cross member comprising a block having either holes or studs defining its pivot axes, or a combination of the two such as a through-hole in one direction and studs in the other direction at right angles thereto.

Still another object is to provide the two parts of the connector member which are connected together by a dove-tail connection with a bore to receive the end of a shaft, the bore being formed partly in one of the two parts and partly in the other so that when the shaft is in position therein the dove-tail joint is effectively held against subsequent disconnection.

Still another object is to provide a universal joint of dual character wherein two connector members are connected to separate cross members, and a link connection is provided between the two cross members, the link connection haivng pivotal coaction with the two cross members, and the two connector members also having pivotal connection with the two cross members at right angles to the pivotal connections thereof to the link connection.

A further object is to provide the link connection, either formed in two parts with means to connect them together, or in one part with bifurcated ends receiving the cross members and provided with pivot pins for the ends of the link mmeber.

Brief summary of the invention

Two-part connector members are provided in a universal joint for pivotal coaction with pivot means of a cross member, and are assembled together by dove-tail joints. The dove-tail surfaces are formed on a radius from the pivot axes of the connector members and the cross member to facilitate assembly and prevent disassembly after the two parts of the connector member are assembled and locked in assembled position.

Brief description of the drawings

FIG. 1 is a longitudinal sectional view through a universal joint embodying my invention.

FIG. 2 is a plan view thereof, FIG. 1 being taken on the line 1—1 of FIG. 2.

FIG. 3 is a plan view similar to FIG. 2, but showing two parts of one of the connector members disconnected from each other as in a position prior to assembly.

FIG. 4 is a sectional view on the line 4—4 of FIG. 1.

FIG. 5 is an end view of FIG. 2.

FIG. 6 is a sectional view similar to FIG. 1 showing a stud type cross member in place of a through-hole cross member as shown in FIGS. 1 to 5 inclusive.

FIG. 7 is an exploded perspective view of the universal joint shown in FIGS. 1 to 5, but showing square bodies on the connector members instead of round bodies, certain bores of FIGS. 1 to 5 being omitted.

FIG. 8 is a similar exploded perspective view of the universal joint shown in FIG. 6.

FIG. 9 is a perspective view of a connector member of modified form with respect to those shown in FIGS. 7 and 8.

FIG. 10 is a plan view of a dual type of universal joint, particularly for misaligned shafts.

FIG. 11 is an exploded perspective view thereof, and

FIG. 12 is a perspective view of a modified form of link compared to that shown in FIGS. 10 and 11.

Description of the preferred embodiments

On the accompanying drawings I have used the reference character C to indicate in general a cross member of female type, C1 a first connector member and C2 a second connector member. In FIGS. 1 to 5, inclusive, the connector member C is of the female type, being a block 10 having a through-hole 12, and a through-hole 14 at right angles to the through-hole 12. The connector member C1 has a pair of studs 16 entering the through-hole 12, and the connector member C2 has a pair of studs 18 entering the through-hole 14 to serve as pivot axes for the universal joint.

The connector member C1 is made in two parts identified as 20 and 22, and the connector member C2 has two parts identified as 24 and 26. The parts 20 and 22 are dovetailed together and the parts 24 and 26 are likewise dove-tailed together, the dove-tail surfaces being indicated at 28 and 30, respectively. A particular point of novelty with respect to the dove-tail surfaces 28 and 30 are that they are generated on a radius from the respective pivot axes for the connector members C1 and C2 (axes of the studs 16 and 18 respectively) so that the connector members may be assembled to the cross member in a novel manner which results in a final product of rugged and reliable construction.

This is particularly illustrated in FIG. 3 wherein the two parts 24 and 26 of the connector member C2 are out of alignment with each other and it is obvious that the dove-tail surfaces 30 may be swung into association to the final position shown for instance in FIG. 2, etc. and thereafter when locked in that position the connector member is assembled relative to the cross member in a permanent manner without the necessity of through-pins or other types of connectors for the pivotal axes.

One method of preventing disassembly after the parts are in the position of FIG. 2 is to merely insert the usual shafts to which the universal joint is connected in bores 32 of the two parts of each connector member C1 and C2, the shafts (not shown) being keyed or set-screwed in position in the usual manner. Obviously, thereafter the two parts of each connector member cannot be spread apart as in FIG. 3, because they are prevented from doing so by the shaft in its bore.

In FIG. 6 the cross member C is of male type (rather than the female type of FIGS. 1–5) and comprises a block 34 having oppositely extending studs 36 (and 38 as clearly shown in FIG. 8). The universal joint of FIGS. 6 and 8 are adaptable for assembly in the same way (with arcuate dove-tail joints) whether the cross member is of the female or male type.

FIGS. 7 and 8 illustrate clearly the constructional features of the connector members and cross member, and also the various dove-tail surfaces 28 and 30 in a variety of patterns. In FIG. 9 a modified form of cross member C is shown having a block 40 with one axis formed by a through-hole 42, and the other by studs 44. As between FIGS. 7, 8, and 9, various modifications of connections are disclosed using the basic principle of arcuate dove-tail joints for connecting the two parts of the connector members together in all cases.

The arcuate dove-tail joint feature is also adaptable to dual types of universal joints such as those shown in FIG. 10, wherein the combination of two connector members C1 and C2, two cross members C, and a link L are provided. In FIGS. 10 and 11 the link L is of two parts construction, the parts thereof being shown at 46 and 48 and connected together by a screw or rivet 50, whereas in FIG. 12 the link is single character with bifurcated arms and provided with pivot pins 52 for the through-holes of the cross members C. The pins 52 may be provided with grooves adjacent their ends for C-spring keepers.

From the foregoing description it will be obvious that the dove-tail connection disclosed in which the dove-tail surfaces are generated about an axis provide a connecting means of novel character for the connector members of universal joints and the like. The novel feature referred to is adaptable for different types of universal joints, and in each instance the parts are rigidly connected together when they are locked against subsequent misalignment by the shafts that enter their bores or by any other suitable means.

I claim as my invention:

1. In a universal joint structure, a cross member having axes at right angles to each other, a first connector member pivotally associated with one of said axes, a second connector member pivotally associated with the other of said axes, at least one of said connector members being formed in two parts, said parts having a dove-tail connection with each other wherein the inclined side edges of said dove-tail connection are generated on a radius from the cross member axis with which said one of said connector members is pivotally associated.

2. A universal joint structure in accordance with claim 1 wherein said cross member comprises a block having a through-hole defining said axis with which said one of said connector members is pivotally associated, and each of said two parts of said one of said connector members has a stud projecting therefrom, said studs projecting into opposite ends of said through-hole.

3. A universal joint structure in accordance with claim 1 wherein said connector member comprises a block having studs projecting in opposite directions therefrom and defining said axis with which said one of said connector members is pivotally associated, and each of said two parts of said one of said connector members has a perforation, said studs of said block extending into said perforations.

4. A universal joint structure in accordance with claim 1 wherein said one of said connector members has a bore formed partly in one of said two parts, and partly in the other of said two parts.

5. A universal joint structure in accordance with claim 1 wherein said second connector member comprises a link, one end of which is pivotally associated with the other of said axes.

6. A universal joint structure in accordance with claim 5 wherein said link is formed in two parts, and means is provided for connecting said parts together on opposite sides of said cross member.

7. A universal joint structure in accordance with claim 5 wherein said link has a bifurcated end straddling said cross member, and a pivot pin is provided on an axis of said cross member and extends through said cross member and the arms of said bifurcated end.

8. A universal joint structure in accordance with claim 5 wherein a second cross member is pivotally associated with the opposite end of said link, and a third connector member is pivotally associated with said second cross member.

9. A universal joint structure in accordance with claim 8 wherein said link is formed in two parts, and means is provided for connecting said parts together on opposite sides of said cross members.

References Cited

UNITED STATES PATENTS

| | | | |
|---|---|---|---|
| 1,034,509 | 8/1912 | Ranger | 64—17 |
| 1,143,596 | 6/1915 | Bockhoff | 64—17 |
| 1,947,959 | 2/1934 | Williston | 64—17 |

FOREIGN PATENTS

| | | |
|---|---|---|
| 480,118 | 4/1953 | Italy. |

HALL C. COE, Primary Examiner